(12) United States Patent
Kukita

(10) Patent No.: US 7,330,177 B2
(45) Date of Patent: Feb. 12, 2008

(54) HAND-HELD PORTABLE ELECTRONIC APPARATUS

(75) Inventor: Makoto Kukita, Totsuka-ku (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 11/009,047

(22) Filed: Dec. 13, 2004

(65) Prior Publication Data

US 2005/0099386 A1 May 12, 2005

Related U.S. Application Data

(63) Continuation of application No. 09/619,614, filed on Jul. 19, 2000, now Pat. No. 6,844,869.

(30) Foreign Application Priority Data

Jul. 19, 1999 (JP) .................................. 11-205400

(51) Int. Cl.
*G09G 5/08* (2006.01)
(52) U.S. Cl. ...................................... 345/157; 361/683
(58) Field of Classification Search ................ 345/156, 345/157, 160–164, 167; 361/608, 683, 686
See application file for complete search history.

(56) References Cited

U.S. PATENT DOCUMENTS

| 4,415,250 | A | | 11/1983 | Rossmann et al. |
| 4,458,238 | A | * | 7/1984 | Learn ........................... 341/20 |
| 5,128,671 | A | * | 7/1992 | Thomas, Jr. .................. 341/20 |
| 5,382,962 | A | | 1/1995 | Young |
| 5,402,150 | A | | 3/1995 | Stiles |
| 5,669,781 | A | | 9/1997 | Ishida |
| 5,982,355 | A | * | 11/1999 | Jaeger et al. ................ 345/161 |
| 5,982,356 | A | * | 11/1999 | Akiyama .................... 345/161 |
| 6,035,491 | A | | 3/2000 | Hartigan et al. |
| 6,163,326 | A | * | 12/2000 | Klein et al. .................. 345/156 |

FOREIGN PATENT DOCUMENTS

| JP | 05-12957 | 2/1993 |
| JP | 07-044270 | 2/1995 |
| JP | 07-239752 | 9/1995 |
| JP | 09-145385 | 6/1997 |
| JP | 10-20964 | 1/1998 |
| JP | 10-020964 | 1/1998 |

* cited by examiner

*Primary Examiner*—Amr A. Awad
*Assistant Examiner*—Tom V Sheng
(74) *Attorney, Agent, or Firm*—Oblon, Spivak, McClelland, Maier & Neustadt, P.C.

(57) ABSTRACT

A portable electronic apparatus including a main body having a display unit on a surface and a protruding holding unit. The holding unit includes a pointing device and switches that are operated by a same hand holding the holding unit. The pointing device includes one of a stick type pointing device and a trackball type pointing device that performs pointing operations including moving a cursor displayed on the display unit. The switches are for setting or canceling instructions given by the pointing device with click operations. The holding unit is also configured to be folded toward a side of the main body. When it is folded, an electric power supply is automatically turned off or put in a standby state and when the holding unit is unfolded to its original position, the electric power supply is a turned on or put in an operating state.

17 Claims, 2 Drawing Sheets

HAND-HELD PORTABLE ELECTRONIC APPARATUS

CROSS-REFERENCE TO RELATED APPLICATIONS

The present invention is a continuation of U.S. patent application Ser. No. 09/619,614, filed Jul. 19, 2000 now U.S. Pat. No. 6,844,869, which claims priority to and contains subject matter related to Japanese Patent Application No. 11-205400, filed on Jul. 19, 1999, the entire contents of each of which are incorporated herein by reference.

BACKGROUND OF THE INVENTION

1. Field of the Invention

The present invention relates to a portable electronic apparatus with an improved operability, and more particularly to a hand-held portable electronic apparatus including a protruding holding unit that can be operated by a same hand holding the portable electronic apparatus.

2. Description of the Related Art

It is known electronic apparatuses (such as a portable computer, a portable word processor, various types of portable electronic terminal apparatuses, etc.) are configured so various operations can be performed by operating a pointing device and switches of the apparatus with fingers of one hand holding the apparatuses. These apparatuses are conveniently configured to be operated by only one hand holding the apparatus when a user is in, for example, a crowded train or when the user holds a bag with the other hand, and so on.

For example, a portable information processing apparatus having a rectangular plate shape and a thickness suitable for holding it with one hand (e.g., with the left hand) is described in Japanese Patent Laid-Open Publication No. 10-20964. This known apparatus includes an LCD display and a pointing device, which is operable only with a thumb of the left hand. Accordingly, the pointing device is located at an appropriate place on a left side edge of the LCD display. Also included on the back side of the apparatus is an instruction switch for setting a position designated on the LCD display by the pointing device or to cancel the designation. The instruction switch can be operated with the fingers of the left hand other than the thumb.

The known portable information processing apparatus is held at the edge of the rectangular plate-shaped body with the thumb and other fingers of one hand. The pointing device is operated with fingers of the same hand holding the apparatus. When the pointing device or the instruction switch is operated with respective fingers of the hand holding the apparatus, the apparatus shakes or sways, making it difficult to operate. This results in misoperations. When the pointing device is operated with the thumb, the apparatus especially tends to sway due to changes in the positions where respective forces of the other fingers are exerted.

Because the apparatus is held at its surface and backside by the thumb and other fingers, respectively, the operation of the pointing device (e.g., moving a cursor on the display) must be performed by exerting an extra force on the pointing device with the thumb (i.e., to offset the intensity of forces of the other fingers holding the apparatus). However, the thumb tends to slip over the pointing device when the force exerted on the pointing device by the thumb is increased. When the thumb slips over the pointing device and drops from the surface of the apparatus or accidently moves to an edge of the apparatus (where it is hard to exert pressure with the thumb), the apparatus may slip out of the user's hand, fall to the ground and be damaged.

SUMMARY OF THE INVENTION

Accordingly, one object of the present invention is to solve the above-noted and other problems.

Another object of the present invention is to provide a novel portable electronic apparatus, which can be operated with the same hand holding the apparatus without the apparatus swaying and possibly dropping to the ground.

To achieve these and other objects, the present invention provides a portable electronic apparatus including a main body having a display unit on a surface and a protruding holding unit. The holding unit includes a pointing device and switches that are operated by a same hand holding the holding unit. The pointing device includes one of a stick type pointing device and a trackball type pointing device that performs pointing operations including moving a cursor displayed on the display unit. The switches are for setting or canceling instructions (with click operations) given by the pointing device.

The holding unit is also configured to be folded toward a side of the main body. When it is folded, an electric power supply is automatically turned off or put in a standby state and when the holding unit is unfolded to its original position, the electric power supply is a turned on or put in an operating state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
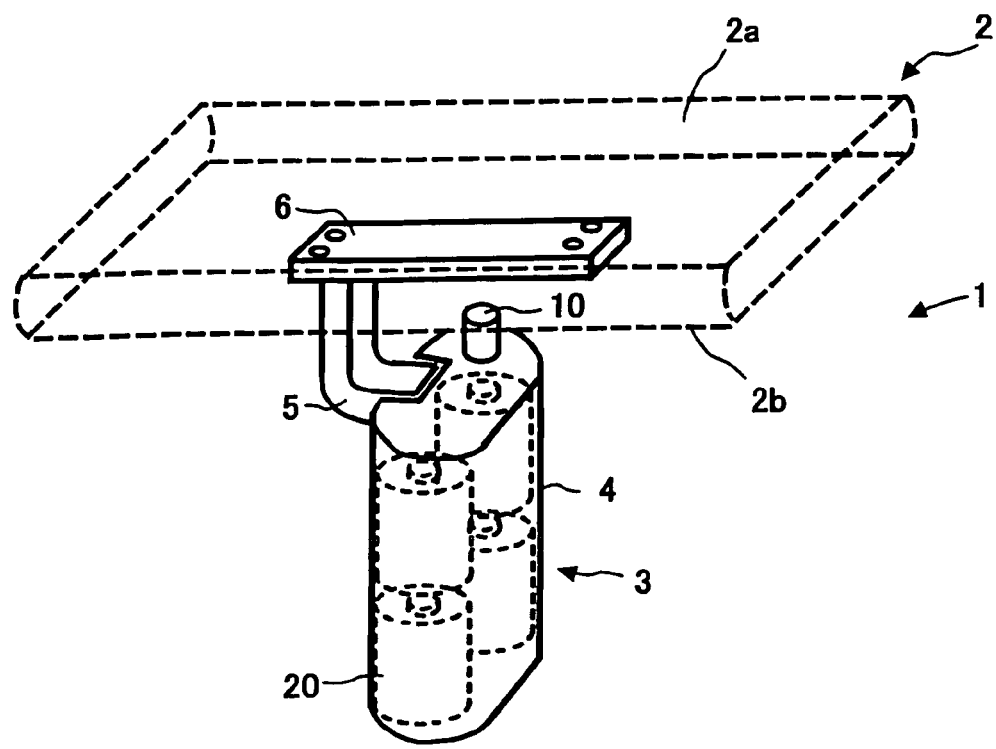
FIG. 1A is a schematic of a portable electronic apparatus according to the present invention.
Figure 1B:
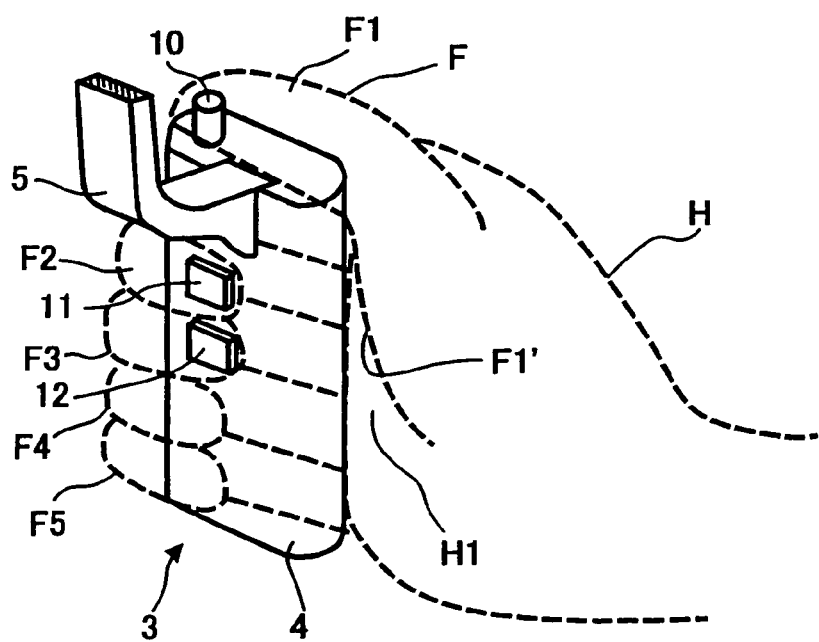
FIG. 1B is a schematic of a holding unit of the portable electronic apparatus according to the present invention.

Referring now to the drawings, wherein like reference numerals designate identical or corresponding parts throughout the several views, FIGS. 1A and 1B are schematics of a portable electronic apparatus 1 according to the present invention. The portable electronic apparatus 1 includes a main body 2 having a display unit (not shown) on a top surface 2a and a holding unit 3 attached to a bottom surface 2b. The holding unit 2 protrudes in a downward direction and is configured to be fitted within the palm and operated with any finger(s) of the hand.

The holding unit 3 includes a grip 4 configured so an operator can grip it with one hand, a connector 5 extending in an upward direction from an upper part of the grip 4 and a fixing member 6. The holding unit 3 is attached to the main body 2 by fixing the fixing member 6 on the bottom surface 2b of the main body 2 using screws, for example. The holding unit 3 can also be attached to the bottom surface 2b of the main body 2 by means other than screws, such as by configuring an upper end part of the connector to be detachable from the bottom surface 2b. Various configurations can be selected for attaching the connector 5 to the bottom surface.

The grip 4, almost cylindroid-shaped, includes a pointing device 10 and switches 11, 12 which can be operated by any one of fingers F of one hand H holding the grip 4 (the right hand in this example). The pointing device 10 is a mechanism configured to perform pointing operations, such as moving the cursor displayed on the display unit, and it may be either a stick type as illustrated in FIG. 1A or a trackball type (not shown), for example. The pointing device 10 is placed at an appropriate location on an upper end surface of the grip 4 in a protruding configuration. The location and height of the protrusion of the pointing device 10 are selected so an operator can operate it with the fingertip of the thumb of one hand H. The switches 11, 12 are mechanisms configured to determine or cancel instructions (with click operations) given by the pointing device 10 and are placed where they can easily be operated with fingertips of the forefinger and the middle finger of the one hand H, respectively.

In one example of the present invention, the grip 4 can be sufficiently grasped with the palm H1, the ring finger F4 and the little finger F5 without involving the forefinger F2 and the middle finger F3 (see FIG. 1B). Consequently, both fingertips of the forefinger F2 and middle finger F3 are free to perform ON/OFF operations of the switches 11, 12. In addition, because the grip 4 may be firmly grasped with the palm H1, ring finger F4 and little finger F5, the grip 4 and the main body 2 is not shaken or swayed when the thumb F1, the forefinger F2 and the middle finger F3 are moved within their operating ranges. Therefore, the pointing device 10 and the switches 11, 12 can be operated stably with the thumb F1, the forefinger F2 and the middle finger F3 while the grip 4 is firmly held. In addition, a viewability of displayed information on the display unit is not decreased. In other words, because the grip 4 is grasped with the palm H1 (including the bottom of the thumb F1'), the ring finger F4 and the little finger F5 which are not directly involved in operations of the pointing device 10 and switches 11 and 12, the other fingers (i.e., the thumb F1, the forefinger F2 and the middle finger F3) are free to operate the pointing device 10 and switches 11, 12. Thus, the portable electronic apparatus is not shaken or swayed as discussed above.

Further, because the grip 4 is mainly grasped with the palm H1, the ring finger F4 and the little finger F5, the thumb F1 operating the pointing device 10 can move freely which increases an operability. Thus, even when the thumb F1 slips off the pointing device 10, the apparatus 1 is not jerked out of the hand.

In addition, based on the size of the operator's hand, a portion between the second and third arthroses of the forefinger F2, middle finger F3, ring finger F4, little finger F5 and possibly the bottom F1' of the thumb F1 may be used to hold the grip 4. Accordingly, a reference to the palm in the examples of the present invention may include a periphery of the palm used for grasping the grip 4.

According to the present invention, the pointing device 10 and switches 11, 12 provide similar functions as a mouse. That is, right and left clicks in the mouse may be assigned to respectively correspond to the switches 11, 12 and moving the cursor may be assigned to correspond to the pointing device 10. Thus, the operability of the pointing device 10 and switches 11, 12 is the same as the mouse.

In addition, the grip 4 shown in FIGS. 1A and 1B is configured to be held with the right hand. Obviously, the grip 4 can be configured for holding the left hand. Further, as discussed above, the pointing device 10 and switches 11, 12, have a similar construction as a mouse. Thus, the same electrical interface as for a mouse can be used. When the same electrical interface is used, the holding unit 3 functions as an ordinary mouse without needing a specific device driver. That is, it is possible to maintain compatibility with a mouse.

In addition, the holding unit 3 may alternatively be attached to a position other than on the bottom surface 2b (e.g., on a side surface of the main body 2). However, it is preferable the holding unit 3 is located on a center of the bottom surface 2b of the main body 2 considering a balance of weight when the holding unit 3 is held with one hand. Further, the pointing device 10 may be placed at an appropriate place on a periphery of the grip 4 so as to be operated with the forefinger or the middle finger.

Figure 2:
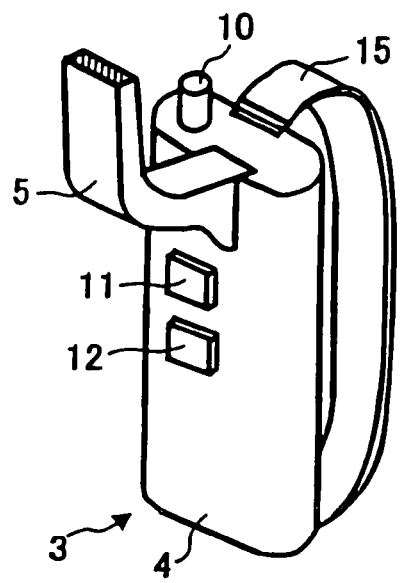
FIG. 2 is a perspective view illustrating another example of a portable electronic apparatus according to the present invention.

In addition, as shown in FIG. 2, a grip belt 15 may be added to the grip 4 by securing upper and lower ends of the belt 15 to the grip 4. The grip belt 15 may be made of fabric, etc. Thus, the operator can grasp the grip 4 by inserting fingers except the thumb into a space between the grip belt 15 and the grip 4 while a back of the hand contacts an inner surface of the grip belt 15. This further prevents the grip 4 from slipping off. In this case, because a force exerted by the ring and little fingers required to grasp the grip 4 is decreased (without worrying about dropping the apparatus), the other fingers involved in the operation may easily be moved.

The portable electronic apparatus 1 also includes batteries which may be stored in a battery compartment provided in the main body. However, with this configuration, the main body 2 is heavier in weight than the holding unit 3. Therefore, a balance in weight between the main body 2 and the holding unit 3 is reduced. To keep the main body 2 and the holding unit 3 in balance, the weight of the holding unit 3 can be increased by adding a weight, for example. However, this increases the total weight of the device which reduces an operability of the device with one hand.

The batteries 20 may also be stored in the grip 4, rather than in the main body 2, as shown in FIG. 1A. In this configuration, the weight of the main body 2 is reduced because the batteries 20 are stored in the grip 4 and accordingly the weight of the grip 4 is increased. That is, the center of gravity of the apparatus is lower. Consequently, the weight imposed on the hand holding the apparatus is decreased. This is particularly advantageous when an operator is using the apparatus for extended periods of time. In addition, the batteries 20 can be removed by opening a lid (not shown) of the battery compartment provided on the bottom surface of the grip 4.

Figure 3A:
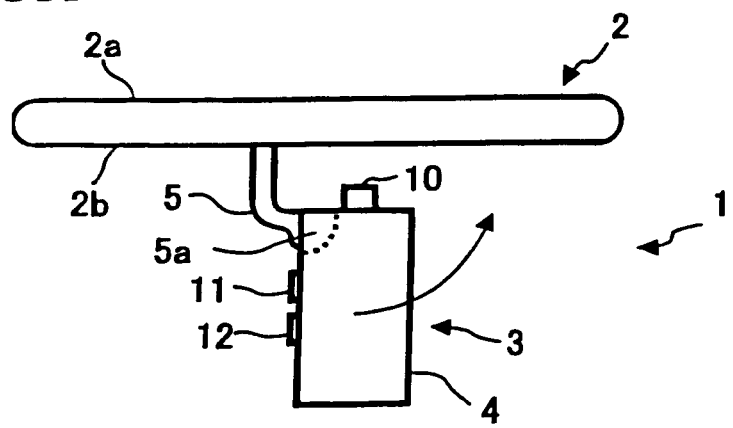
FIG. 3A is a side view of a foldable holding unit of the portable electronic apparatus according to the present invention.
Figure 3B:
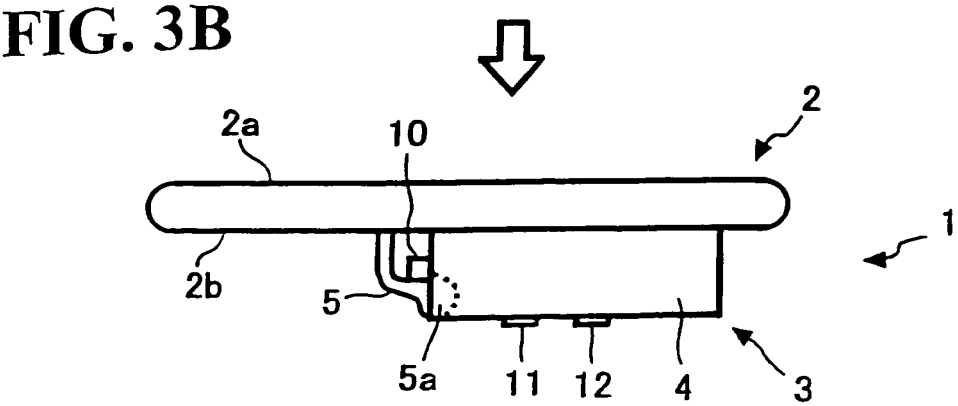
FIG. 3B is another side view of the foldable holding unit of the portable electronic apparatus according to the present invention.

In the above-described examples of the present invention, the portable electronic apparatus is bulky when it is carried or stored because the holding unit 3 protrudes from the plank-shaped main body 2, thus forming a T-shape. Hence, according to another example of the present invention, the holding unit 3 is configured to fold toward a side of the main body 2 as illustrated in FIGS. 3A and 3B. That is, in this example, the grip 4 is configured to rotate in a vertical direction with an upper part of the grip 4 connected to a hinge 5a provided at a lower edge of the connector 5.

As shown in FIG. 3A, the holding unit 3 protrudes from the main body 2 when the portable electronic apparatus 1 is in use. However, when it is not in use, the holding unit 3 can be rotated in a direction indicated by the arrow A until it contacts the bottom surface 2b. When the holding unit 3 is completely folded as illustrated in FIG. 3B, the portable electronic apparatus 1 has a shape without substantial protrusions and may be easily carried or stored.

In addition, latching devices are provided at the hinge 5a and bottom surface 2b so the grip 4 can be firmly placed at its positions when it is unfolded and folded as illustrated in FIGS. 3A and 3B.

Further, a display unit in portable electronic apparatuses generally has a flat shape. When the holding unit 3 of the present invention is attached to these portable electronic apparatuses, it is preferable the holding unit 3 is attached orthogonally to the flat shaped display unit in consideration of a load imposed on the wrist, etc. of the operator. In this case, the apparatus is inconvenient to carry or store. However, because the holding unit 3 is configured to be folded and placed in the same direction as a plane surface of the main body 2, the apparatus generally has a flat shape and is smaller in size.

In addition, in the above-described example, when the portable electronic apparatus 1 is not used, a power switch provided at the main body 2 has to be turned off and then the holding unit 3 is folded. In addition, when the portable electronic apparatus 1 is used, the power switch has to be turned on and the holding unit 3 is unfolded. This is cumbersome for the operator.

Thus, according to another example of the present invention, the portable electronic apparatus 1 is configured so an electric detection switch (not shown) provided at the hinge 5a detects whether the grip 4 is unfolded or folded. Then according to a signal from the electric detection switch, an electric power supply of the portable electronic apparatus 1 is automatically turned on or off, set in a standby state or set in an operating state. That is, the portable electronic apparatus 1 is configured to automatically turn off the power switch when the grip 4 is folded and turn on the power switch when the grip is unfolded. Alternatively, the portable electronic apparatus 1 may be set in the standby state and the operating state when the grip 4 is folded and unfolded, respectively.

Thus, with this feature, an operation of the electric power supply switch or a standby switch is not required, which substantially increases an operability. That is, the electric detection switch eliminates the need to manually turn on and off the apparatus (i.e., this is achieved by simply folding and unfolding the grip 4).

In other words, the present invention advantageously provides a novel portable electronic apparatus that can be stably and accurately operated without having a disadvantage or an inconvenience even when the apparatus can be only held and operated by one hand, such as in a crowded train.

Obviously, numerous modifications and variations of the present invention are possible in light of the above teachings. It is therefore to be understood that within the scope of the appended claims, the invention may be practiced otherwise than as specifically described herein.

The invention claimed is:

1. A portable electronic apparatus, comprising:
   a body having a display unit on a top surface thereof; and
   a holding unit protruding substantially perpendicular from a bottom surface of the body for holding the portable electronic apparatus and including a menu navigating device for navigating a menu displayed on the display unit and a switch configured to be operated by a same one hand holding the holding unit so that the portable electronic apparatus is able to be supported, held, and operated with one hand,
   wherein the holding unit includes a grip configured to be grasped at least with a palm of said one hand such that when said one hand holds the holding unit, the palm of said one hand holding the holding unit is also substantially perpendicular to the bottom surface of the body;
   wherein said holding unit is configured to store batteries which are used for an electric power source to operate said portable electronic apparatus.

2. The portable electronic apparatus according to claim 1, wherein the grip is further configured to be grasped such that when said one hand holds the holding unit, a plane of a back of said one hand is substantially perpendicular to the body.

3. The portable electronic apparatus according to claim 1, wherein the grip is further configured to be grasped such that when said one hand holds the holding unit, the menu navigating device is configured to be operated by a thumb of said one hand.

4. The portable electronic apparatus according to claim 1, wherein said body is configured to be folded toward a side of said holding unit.

5. The portable electronic apparatus according to claim 4, wherein at least one of the holding unit and the display unit are automatically put into one of a turned off state and a standby state when said body and said holding unit are folded together, and at least one of the holding unit and the display unit are put into one of a turned on state and an operating state when said body and said holding unit are folded apart.

6. The portable electronic apparatus according to claim 4, wherein a surface of the body having the display unit is configured to be substantially parallel to the palm of said one hand holding the holding unit when the display unit is not in use.

7. The portable electronic apparatus according to claim 4, wherein the display unit is configured to be not in use when the body is folded toward the holding unit.

8. A portable electronic apparatus, comprising:
   a body having a display unit on a top surface thereof; and
   a holding unit protruding substantially perpendicular from a bottom surface of the body for holding the portable electronic apparatus and including a highlighted item changing device for changing a highlighted item displayed on the display unit and a switch configured to be operated by a same one hand holding the holding unit so that the portable electronic apparatus is able to be supported, held, and operated with one hand,
   wherein the holding unit includes a grip configured to be grasped at least with a palm of said one hand such that when said one hand holds the holding unit, the palm of said one hand holding the holding unit is also substantially perpendicular to the bottom surface of the body.

9. The portable electronic apparatus according to claim 8, wherein the grip is further configured to be grasped such that when said one hand holds the holding unit, a plane of the back of said one hand is substantially perpendicular to the body.

10. The portable electronic apparatus according to claim 8, wherein the grip is further configured to be grasped such that when said one hand holds the holding unit, the highlighted item changing device is configured to be operated by a thumb of said one hand.

11. The portable electronic apparatus according to claim 8, wherein said body is configured to be folded toward a side of said holding unit.

12. The portable electronic apparatus according to claim 11, wherein at least one of the holding unit and the display unit are automatically put into one of a turned off state and a standby state when said body and said holding unit are folded together, and at least one of the holding unit and the display unit are put into one of a turned on state and an operating state when said body and said holding unit are folded apart.

13. The portable electronic apparatus according to claim 11, wherein the surface of the body having the display unit is configured to be substantially parallel to the palm of said one hand holding the holding unit when the display unit is not in use.

14. The portable electronic apparatus according to claim 11, wherein the display unit is configured to be not in use when the body is folded toward the holding unit.

15. A portable electronic apparatus, comprising:
a body having a display unit on a top surface thereof; and
a holding unit protruding substantially perpendicular from a bottom surface of the body for holding the portable electronic apparatus and including a pointing device and a switch configured to be operated by a same one hand holding the holding unit so that the portable electronic apparatus is able to be supported, held, and operated with one hand,
wherein the holding unit includes a grip configured to be grasped at least with a palm of said one hand such that when said one hand holds the holding unit, the palm of said one hand holding the holding unit is also substantially perpendicular to the bottom surface of the body;
wherein the holding unit is configured to store batteries which are used for an electric power source to operate the portable electronic apparatus.

16. A portable electronic apparatus, comprising:
means for displaying information on a top surface thereof; and
means for holding the portable electronic apparatus by a hand, said means for holding protrudes substantially perpendicular from a bottom surface thereof the means for displaying information,
wherein said means for holding includes means for moving a cursor by the hand and means for setting or canceling operations by the hand based on a moved location of the cursor, so that the portable electronic apparatus is able to be supported, held, and operated with one hand, and
wherein the means for holding includes means for gripping by a palm of said hand such that when the hand holds the means for holding, the palm of said hand holds the means for holding means substantially perpendicular to the bottom surface of the means for displaying information;
wherein the means for holding is configured to store batteries which are used for an electric power source to operate the portable electronic apparatus.

17. A portable electronic apparatus, comprising:
a body having a display unit on a top surface thereof; and
a holding unit protruding substantially perpendicular and downward from a bottom surface of the body for holding the portable electronic apparatus and including a menu navigating device for navigating a menu displayed on the display unit and a switch configured to be operated by a same one hand holding the holding unit so that the portable electronic apparatus is able to be held and operated with one hand,
wherein the holding unit includes a grip configured to be grasped at least with a palm of said one hand such that when said one hand holds the holding unit, the palm of said one hand holding the holding unit is also substantially perpendicular to the bottom surface of the body;
wherein the holding unit is configured to store batteries which are used for an electric power source to operate the portable electronic apparatus.

* * * * *